INVENTORS
DAVID G. PECKHAM
ROBERT G. MINER
BY Holmes & Andersen
ATTORNEYS

INVENTORS
DAVID G. PECKHAM
ROBERT G. MINER
BY Holmes & Andersen
ATTORNEYS

INVENTORS
DAVID G. PECKHAM
ROBERT G. MINER
BY Holmes & Andersen
ATTORNEYS

United States Patent Office 3,363,674
Patented Jan. 16, 1968

3,363,674
ABSORPTION REFRIGERATION APPARATUS
AND METHODS
David G. Peckham and Robert G. Miner, La Crosse, Wis.,
assignors to The Trane Company, La Crosse, Wis., a
corporation of Wisconsin
Filed Nov. 22, 1965, Ser. No. 509,145
11 Claims. (Cl. 165—26)

ABSTRACT OF THE DISCLOSURE

Automatically controlled unitary gas-fired absorption refrigeration apparatus having a heat exchanger for heating and cooling air and employing air as a heat sink and having means for filling the absorber with absorbent solution during the heating cycle to prevent freezing in the absorber.

---

The usual absorption refrigeration system has a generator in which the absorbent is heated to boil off some of the refrigerant. The refrigerant vapor flows to a condenser in which the refrigerant vapor is condensed to a liquid by heat exchange with an external cooling fluid maintained at a suitable temperature by a heat sink. The liquefied refrigerant flows through a throttle valve or equivalent regulating device to an evaporator which is kept at a reduced pressure so that the liquid refrigerant boils at a relatively low temperature and produces refrigeration. In the evaporator, the cold refrigerant absorbs heat from a fluid which is circulated through the evaporator and is thereby cooled to substantially the evaporator temperature. This cooled external fluid is circulated to a refrigeration load.

The vaporized refrigerant from the evaporator flows to an absorber where it is absorbed by concentrated absorbent solution supplied from the generator. The absorption of refrigerant vapor maintains the low pressure in the evaporator. Since the concentrated absorbent solution was heated in the generator and the act of absorption also generates heat, the absorber must be cooled to suitable operating temperature by heat exchange with an external cooling fluid, the heat sink. From the absorber, the diluted absorbent solution passes to the generator to be concentrated by heating the absorbent solution to boil off some of the refrigerant and thus repeat the cycle. A pump is often used in the system to help return the diluted absorbent solution to the generator. Also, the diluted absorbent solution passing to the generator from the absorber is often put in heat exchange with the concentrated absorbent solution passing from the generator to the absorber. Absorption refrigeration systems are closed, and made as leakproof as possible to prevent the entrance of air or other external materials into the system or the escape of the operating materials from the system.

It is an object of this invention to provide an absorption machine having a first compartment with an evaporator and means for circulating air over the evaporator and a second compartment having a generator, a condenser, an absorber, and means for moving air over the condenser and absorber.

It is another object of this invention to provide an absorption refrigeration system and process for heating or cooling operation in which the condenser and the absorber are exposed to outdoor temperatures without freezing of these components.

It is another object of this invention to provide a compact and efficient air conditioning unit having an absorption refrigeration system and controls therefor which are capable of operating the system for cooling or heating.

It is an object of this invention to provide vertically spaced conduits from the refrigerant reservoir for conducting refrigerant from the reservoir respectively to vertically spaced circuits in the evaporator whereby an increase in level in the reservoir increases the number of circuits in the evaporator which are supplied with refrigerant.

It is a further object of this invention to provide an absorption refrigeration system and process which provides heat for a heating load by supplying refrigerant vapor from the generator to the evaporator while substantially filling the condenser with absorbent from the generator and substantially filling the absorber with solution from the generator to prevent refrigerant vapor from condensing in the condenser and absorber.

It is a further object of this invention to provide an absorption refrigeration system and process which has protection against freezing of refrigerant from a failure of electrical supply, during the heating cycle, by conducting absorption solution from the absorber to the liquid refrigeration circuit.

Other objects and advantages of this invention will be apparent as the specification proceeds to describe the invention with reference to the accompanying drawings in which.

Figure 1:
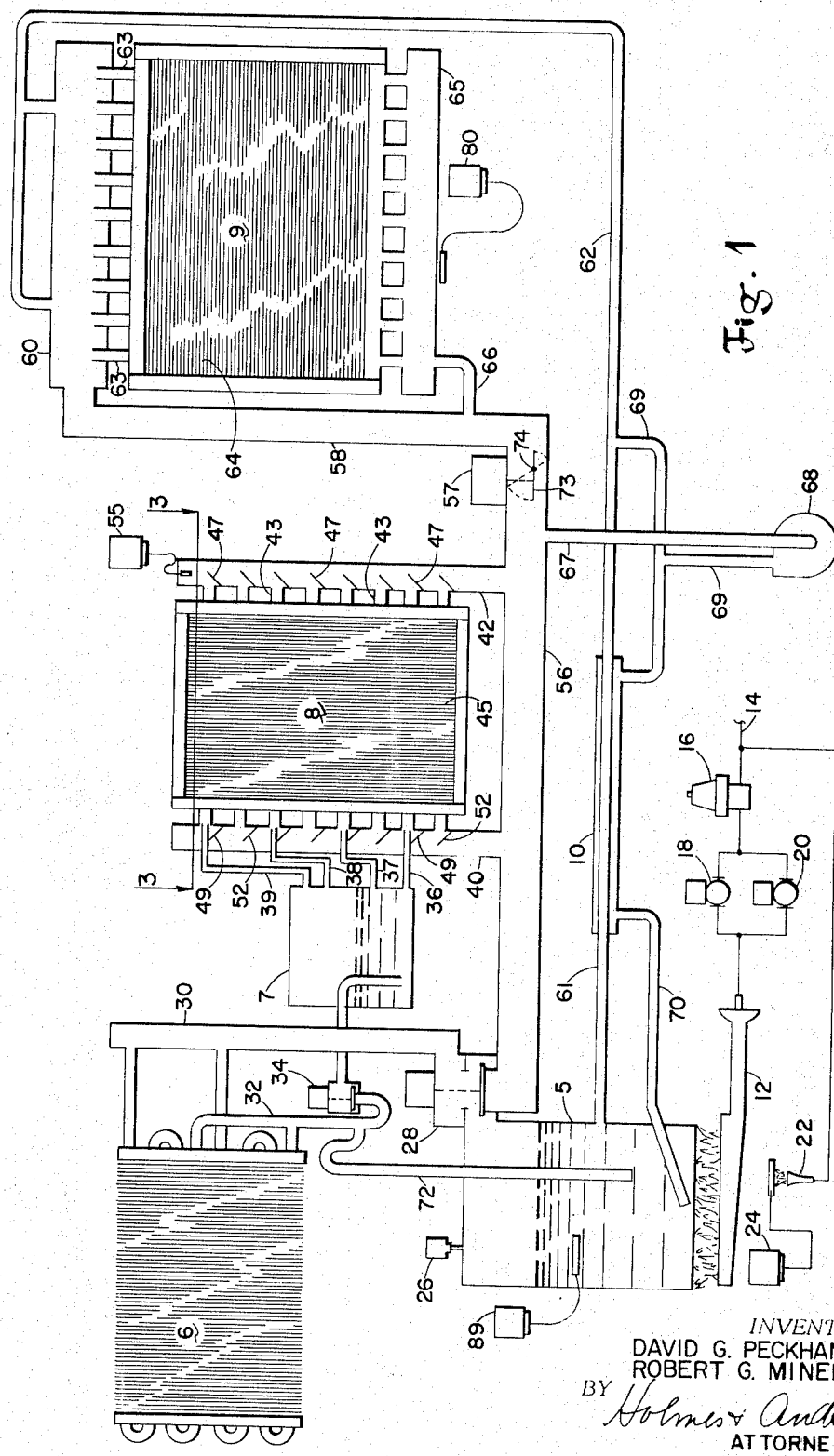
FIGURE 1 shows more or less diagrammatically a system incorporating one embodiment of our invention and showing operation during the cooling cycle.
Figure 2:
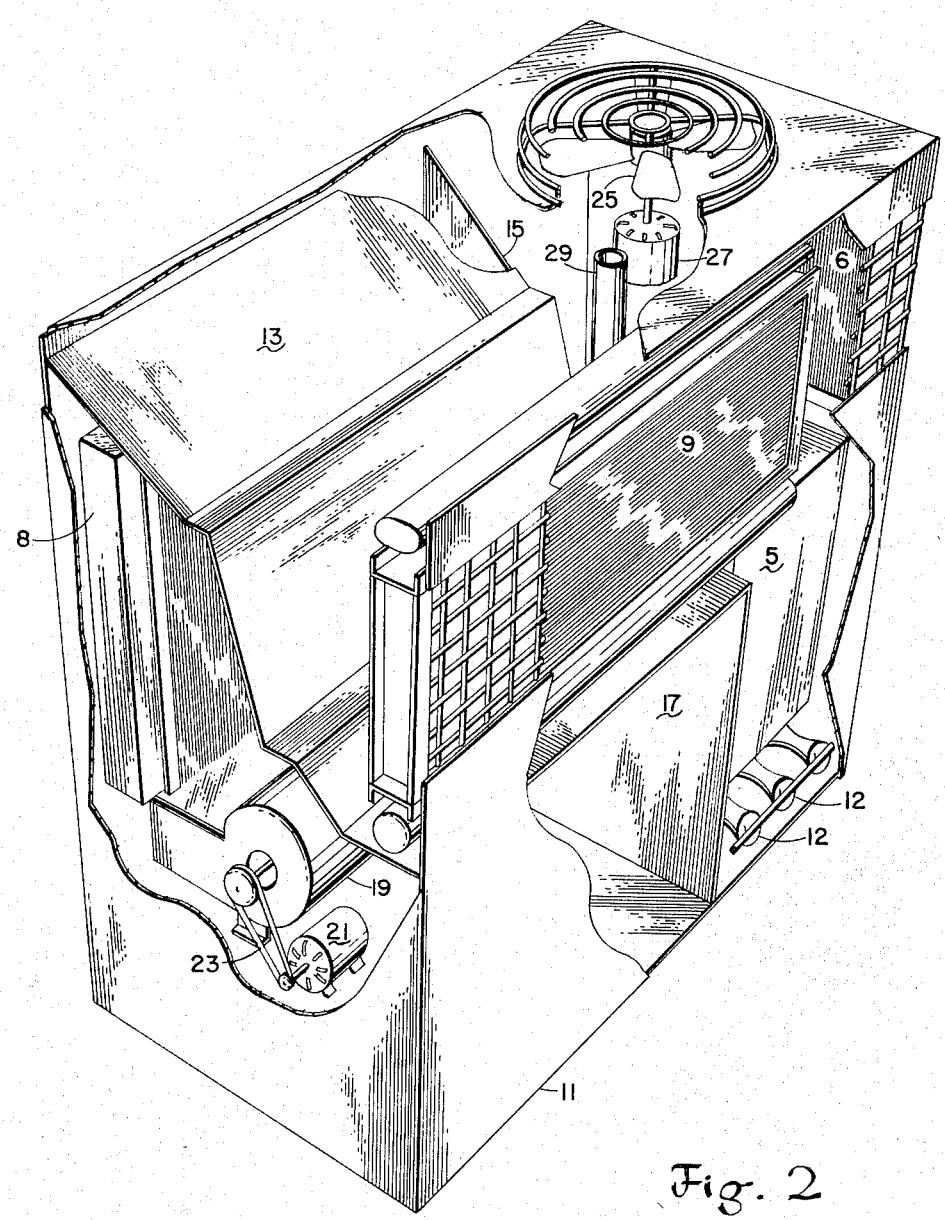
FIGURE 2 is a perspective view of the apparatus referred to in FIGURE 1 and showing the arrangement of the components of the apparatus in a unit with portions of the cabinet broken away to more clearly show the interior construction.

Referring now to FIGURE 1, the present invention is shown applied to a system having a cooling cycle for cooling air in the summer and having a heating cycle for heating air in the winter. As shown in FIGURES 1 and 2, the apparatus comprises generally a generator 5, a condenser 6, a receiver 7, an evaporator 8, and absorber 9 and a heat exchanger 10, all interconnected to provide paths of flow for the circulation of refrigerant and absorbent through the apparatus in closed circuits.

Evaporator 8 is a heat exchange coil which operates as an evaporator during the cooling cycle and as a heater during the heating cycle. For purposes of explanation it will be referred to as an evaporator.

As shown in FIGURE 2 a unit casing 11 has partitions 13, 15, and 17 which divide the interior of the casing into a first chamber and a second chamber. The first chamber contains the evaporator 8, an evaporator fan 19 and a motor 21 for driving the evaporator fan through a belt 23. Air to be conditioned flows from the conditioned space into the casing through evaporator 8, then through fan 19 which discharges the air from casing 11 to the conditioned space.

The second chamber in the casing 11 contains the generator 5, the condenser 6, the absorber 9, and a motor driven fan 25. Fan 25 forces air and flue gases from the second chamber of casing 11 thus drawing in air through condenser 6 and absorber 9 to cool the same. The generator receives air from the second chamber of casing 11 and discharges flue gas through a pipe 29 which has an outlet adjacent to and below fan 25.

Although we contemplate that various combinations of refrigerants and absorbents may be used in the systems of this invention, we prefer to use water as a refrigerant and a metal halide or a combination of metal halides as an absorbent.

Cooling cycle

The operation of the apparatus will first be described with reference to the cooling cycle.

Generator 5 is heated by a burner 12 to vaporize refrigerant from the absorbent. Burner 12 receives gas from a source 14. A pressure regulator 16 reduces the pressure to the desired pressure. A relatively small solenoid gas valve 18 provides for flow of gas for low capacity operation as for instance 25% of full capacity. A relatively larger solenoid valve 20 provides for a greater flow of gas or 75% of full capacity operation so that when both valves are open the system operates at full capacity. A pilot 22 burns continuously for lighting the burner 12. A safety pilot thermostatic switch 24 is provided to prevent starting operation if the pilot is not burning.

A high pressure switch 26 senses pressure in the generator 5 and terminates operation when the pressure in the generator exceeds a predetermined value due to some malfunction.

Refrigerant vapor produced in the generator 5 passes to a three-way solenoid valve 28 which in its normally closed position passes the vapor to a conduit 30 which conducts the vapor to a condenser 6 which transfers heat to an air stream as will be described more fully.

From condenser 6, condensed refrigerant flows through conduit 32 to a solenoid operated valve 34. During cooling operation valve 34 is open and conducts refrigerant liquid to a receiver 7. A plurality of conduits 36, 37, 38 and 39 conduct refrigerant liquid from receiver 7 to evaporator 8. Conduits 36, 37, 38 and 39 are spaced vertically so that as the level rises in receiver 7 additional conduits conduct refrigerant liquid to the evaporator.

Evaporator 8 has a supply header 40 and a return header 42. A first vertical row of horizontal tubes 43 extends between headers 40 and 42 and a second vertical row of horizontal tubes 44 extend between headers 40 and 42. Heat transfer fins 45 are secured to the tubes 43 and 44.

Figure 3:
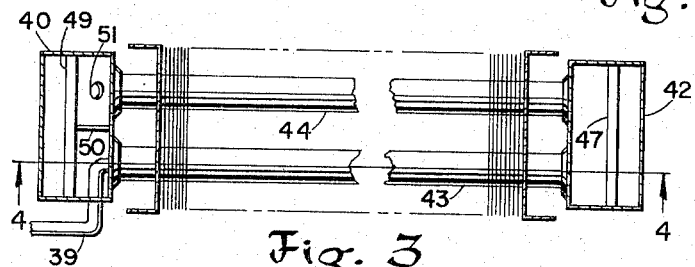
FIGURE 3 is an enlarged sectional view of the evaporator taken on line 3—3 of FIGURE 1.
Figure 4:
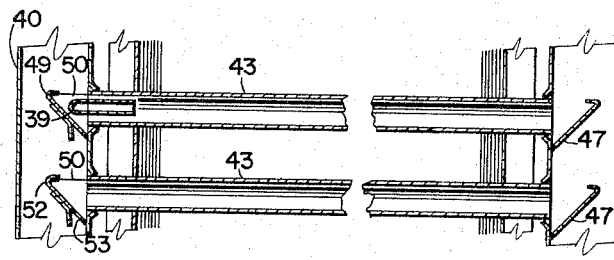
FIGURE 4 is an enlarged vertical sectional view of the evaporator taken on line 4—4 of FIGURE 3.

As shown in FIGURES 3 and 4 the refrigerant liquid flowing in conduit 39 is discharged into a first tube 43 from which it flows into a tray 47 in header 42. The refrigerant vapor generated during the passage of the refrigerant through the first tube 43 passes downwardly through header 42.

Refrigerant liquid in tray 47 passes in a return path through a tube 44 into a tray 49 having a dam 50. Refrigerant vapor generated in tube 44 passes downwardly through header 40 and the remaining refrigerant liquid flows through drain hole 51 in tray 49 to the next lower tray 52 which is similar to tray 49 except that the drain hole 53 is on the opposite side of dam 50. From this lower tray 52 the refrigerant liquid flows through a tube 44 to a tray 47 and thence through a tube 43 to tray 52. If any refrigerant liquid remains after passing through the circuit of four tubes, it flows through hole 53 into the next lower circuit of four tubes.

Conduits 36, 37, and 38 each supply a circuit of four tubes in a manner similar to that described with reference to tube 39.

With refrigerant supplied to less than the total number of evaporator tubes, the ratio of latent cooling to sensible cooling is greater than when refrigerant is to all the tubes.

A low temperature thermostatic switch 55 opens when the temperature goes below 35° F.

The refrigerant vapor in headers 40 and 42 flows into conduit 56 and through a normally open solenoid valve 57 of the pivoted vane type which is open during the cooling cycle. From valve 57 the refrigerant vapor flows through conduit 58 into the supply header 60 of absorber 9.

The previously described flow of refrigerant vapor from the generator 5 is effective in maintaining a concentrated solution of absorbent in the generator 5. This concentrated absorbent solution flows from generator 5 through conduit 61 to heat exchanger 10 in which it exchanges heat with dilute solution flowing from the absorber 9 to the generator 5. The cooled concentrated solution flows from heat exchanger 10 through conduit 62 to header 60 of absorber 9.

The absorbent solution in header 60 overflows into absorber tubes 63 and flows in a film down the inside surfaces thereof. The refrigerant vapor also flows downwardly in absorber tubes 63 and is absorbed by the film of absorbent on the inside surface of the tubes. Heat transfer fins 64 are secured on the tubes 63 and is old and well known. Fan 25 draws air through the absorber 9 to remove heat therefrom.

The solution flows from tubes 63 into a return header 65 from which it flows successively through conduit 66, conduit 58, valve 57 and into conduit 68. The solution from the discharge of pump 68 flows in part through conduit 69 into conduit 62 and to the absorber 9 and in part through heat exchanger 10 and thence through conduit 70 into the lower portion of generator 5 to be reconcentrated.

Solution concentration is reduced as the load is reduced so that dilution of the absorbent solution is not necessary when the machine is shut off after low load operation. If there is a power failure during a cooling cycle, motors 21 and 27 of fans 19 and 25 stop, solution pump 68 stops and gas valves 18 and 20 close. Also refrigerant liquid valve 34 closes. Refrigerant liquid flows from reservoir 7 into the evaporator 8 and thence into conduits 56 and 67 to dilute the solution draining out of the absorber 9 and thus prevent solidification of solution in these conduits.

The concentrated solution in conduit 62 and in heat exchanger 10 drains by gravity through conduit 70 to the generator 5.

Heating cycle

During the heating cycle valve 34 is de-energized and therefore in closed position. The condenser 6 is exposed to outside temperature which is usually low during the heating cycle with the result that refrigerant vapor condenses therein with the result that a low pressure is created. The pressure in generator 5 is greater than the pressure in condenser 6, and therefore solution flows through conduit 72 from the generator 5 to the condenser 6 to fill the condenser with solution. This action occurs after the solution has been diluted with refrigerant from the receiver 7, and therefore the solution will not solidify at normal winter temperatures.

During the heating cycle valve 28 is open between the generator 5 and conduit 56 to pass steam to conduit 56. From conduit 56 the steam flows to evaporator headers 40 and 42 and thence to evaporator tubes 43 and 44. It is thus seen that evaporator 8 operates as a heating coil to heat the air of the conditioned space. The steam condensate flows downwardly through headers 40 and 42 via trays 47, 49, and 52 and thence into conduit 56 from which it flows successively to conduit 67, pump 68, heat exchanger 10, conduit 70 and generator 5.

With valve 57 closed and absorber 9 exposed to a low outside ambient temperature, condensation of vapor takes place in the absorber 9 and a low pressure is created with the result that absorbent solution flows through conduit 62 to fill the absorber 9 with solution thus preventing freezing in the absorber 9. This action occurs after the solution has been diluted with refrigerant from the receiver 7, and therefore the solution will not solidify at normal winter temperatures.

If for some reason the pilot 22 should become extinguished in freezing weather, the condensate returning to the generator via conduit 67, pump 68, heat exchanger 10 and conduit 70 might freeze in spite of the fact that these passageways are insulated. To prevent this we construct the solenoid valve 57 in a particular manner as will now be described. The blade 73 has a pivot 74 which is offset with respect to the axis of conduit 56 with the result that a column of liquid in conduit 58 would act against a larger area with a force tending to open the vane 73 and against a smaller area with a force tending to hold the vane 73 closed. The solenoid is provided with insufficient power to hold the vane 73 in closed position against the force of the column of liquid in the absorber 9 when the pressures of the evaporator and generator decrease with temperature due to loss of heat from pilot 22. The solution released from absorber 9 will force the refrigerant liquid in conduit 67, pump 68, heat exchanger 10 and conduit 70 into the generator 5 and mix with any remaining liquid refrigerant thereby preventing destructive freezing in these spaces.

Controls

Figure 5:
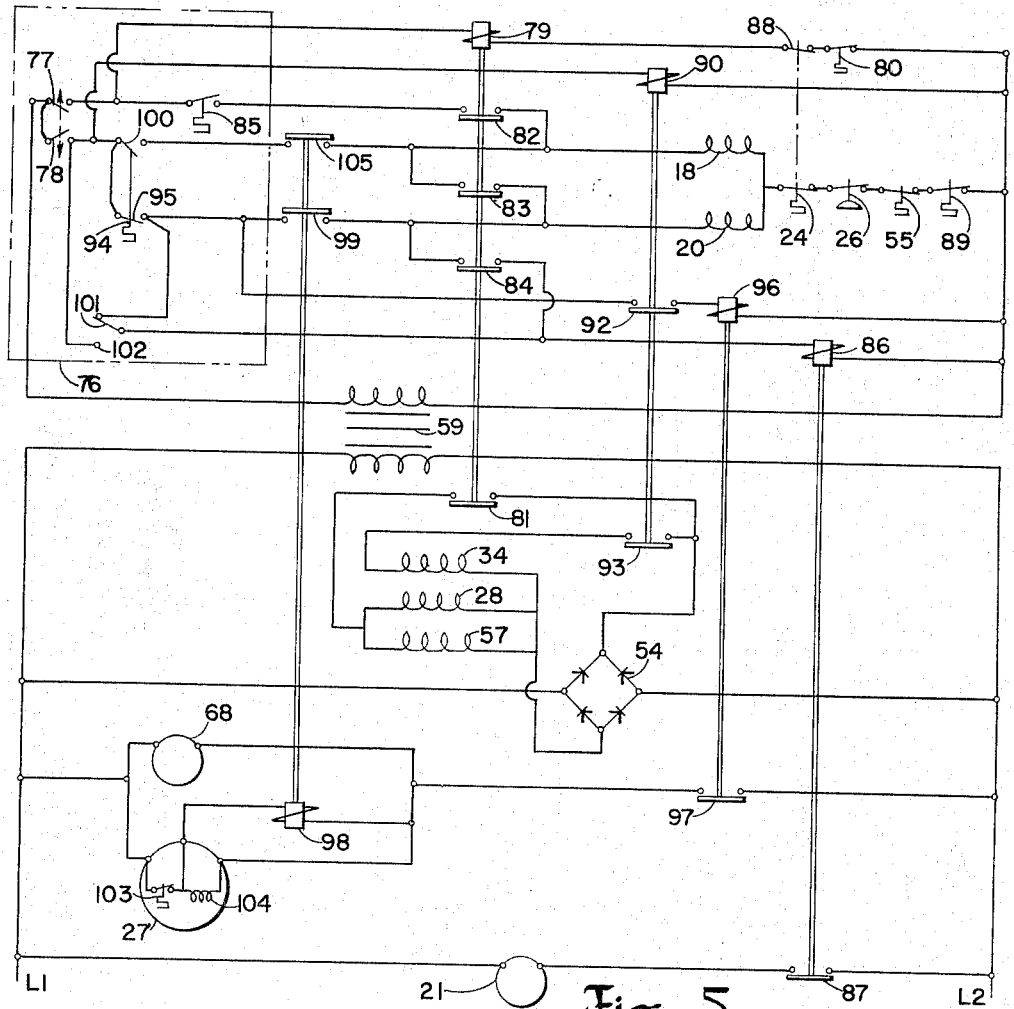
FIGURE 5 is a diagram showing the controls of our invention.

The control system will now be described with reference to FIGURE 5. A source of alternating current indicated by lines L1 and L2 powers the controls. A rectifier 54 furnishes a source of direct current for the solenoid valves 28, 34, and 57. A transformer 59 furnishes reduced voltage for some controls.

A selective controller 76 is preferably mounted in the unit at a location where it is exposed to the temperature of the space conditioned by the unit. A heating and cooling selector has a heating switch 77 and a cooling switch 78.

When selector switches 77 and 78 are both open, valves 28, 34, and 57 are de-energized; the evaporator fan motor 21, the absorber-condenser fan motor 27, and the pump 68 are de-energized, and gas valves 18 and 20 are closed.

Heating control

Let it now be assumed that it is desired to operate the apparatus for heating and that selector switch 77 is closed. If this is done shortly after operation on the cooling cycle, the concentration level in the machine will be high and it is possible for solidification to occur. Therefore we provide a thermostate 80 responsive to the temperature of the absorber 9. Thermostat 80 does not close until the temperature of the absorber drops below 120° F. The time required for the temperature of the absorber 9 to cool down provides time for the absorbent solution to drain from the absorber and be diluted with refrigerant and thus avoid solidification.

Closing of thermostat 80 energizes heating relay 79. Energization of the heating relay 79 closes contact 81 to energize solenoid valve 28 and solenoid valve 57. Contacts 82, 83, and 84 are also closed so that when the heating thermostat 85 closes and demands heat, the gas valves 18 and 20 are energized to open position, and the evaporator fan solenoid 86 is energized to close contact 87 and start the evaporator fan motor 21.

There are certain safety devices which will prevent the gas valves 18 and 20 from being energized to open position. The safety pilot thermostat 24 prevents energization of the gas valves if the pilot 22 is not burning. The safety pilot thermostat 24 also opens switch 88 when the machine is not capable of operation due to pilot flame failure. Opening of switch 88 de-energizes heating relay 79 which opens contact 81 which in turn de-energizes valves 28 and 57 to permit the solution to flow from the absorber 9 into conduits 56, 67, 69 and 70 and heat exchanger 10 to mix with refrigerant therein to prevent freezing. The high pressure switch 26 also prevents energization if the pressure in the generator 5 is excessive. The low temperature thermostat 55 in the evaporator opens and prevents operation when the temperature of the evaporator is below 35°. The high temperature thermostat 89 in the generator 5 opens above 300° F. and de-energizes gas valves 18 and 20 to closed position.

Cooling control

Let us assume now that it is desired to operate the apparatus for cooling and that switch 78 is closed. This energizes cooling relay 90 which closes contact 92 and also contact 93 to energize valve 34 to open position for flow of refrigerant liquid from condenser 6 to receiver 7. If the temperature of the conditioned space rises slightly above the desired predetermined temperature, cooling thermostat 94 closes contact 95 to energize absorber condenser fan relay 96 which closes absorber condenser fan contact 97 to energize pump 68, relay 98, and the absorber condenser fan motor 27.

Energization of relay 98 closes contacts 99 and 105. With switch 95 and contact 99 closed, gas valve 20 is energized to open position and low capacity cooling operation is obtained.

If the temperature of the conditioned space rises further above the desired predetermined temperature, cooling thermostat 94 closes switch 100 and gas valve 18 is energized to open position to operate the apparatus at full capacity. As the temperature falls toward the desired predetermined temperature, gas valve 18 is first de-energized to reduce the operation to low capacity and when the conditioned space reaches the desired predetermined temperature, gas valve 20 is de-energized to terminate the cooling operation.

A switch 101 may be in the position shown to operate the evaporator fan when the system is operating on the cooling cycle. If it is desired to operate the evaporator fan when the apparatus is on the cooling cycle but not operating, switch 101 may be moved to contact 102 to energize the evaporator fan motor 21 in order to circulate the air in the conditioned space.

The absorber condenser fan motor 27 has a thermostat 103 in series with the motor winding 104 and the relay 98. If the temperature of the motor 27 exceeds a predetermined value, thermostat 103 opens to de-energize the motor winding 104 and de-energize relay 98 which causes contacts 99 and 105 to open and de-energize gas valves 18 and 20 into closed position.

Although the present invention has been described in conjunction with preferred embodiments, it is to be understood that modifications and variations may be resorted to without departing from the spirit and scope of the invention, as those skilled in the art will readily understand. Such modifications and variations are considered to be within the purview and scope of the invention and appended claims.

We claim:

1. In an air conditioning unit, the combination of a casing forming a first chamber and a second chamber, an absorption refrigeration system in said casing comprising an evaporator in said first chamber, means in said first chamber for moving air through said evaporator, an absorber and a condenser mounted in said second chamber across openings in said casing, a generator in said second chamber, said generator having a burner, a combustion air inlet, and a flue gas outlet within said second chamber to receive combustion air from and discharge flue gas to said second chamber and means for forcing air and flue gas from said second chamber whereby air flows into said second chamber through said absorber and said condenser.

2. In an air conditioning unit, a casing having four sides, a first opening and second opening along one side, a third opening along a second side and a fourth opening along a third side, an absorption refrigeration system in said casing comprising an evaporator, means for moving air from a conditioned space into said casing through said first opening, through said evaporator and to said conditioned space through said second opening, an absorber in said casing in said third opening, a condenser in said casing in said fourth opening, means for moving air through said third opening and said absorber, means for moving air through said fourth opening and said condenser, a generator in said casing and means for connecting said evaporator, said absorber, said condenser and said generator for the circulation of absorbent solution and refrigerant.

3. Absorption refrigeration apparatus comprising a generator, a condenser, an evaporator, an absorber, conduits interconnecting said generator and said absorber for flow of absorbent solution, means for conducting refrigerant vapor from said generator to said condenser, means for cooling said condenser to condense refrigerant therein, a receiver, means for conducting refrigerant liquid from said condenser to said receiver, an evaporator having fluid passageways, conduits extending from said receiver to said fluid passageways, said conduits being in fluid flow communication with said receiver at different elevations whereby the level of liquid in said receiver determines which of said fluid passageways receive liquid refrigerant.

4. An absorption refrigeration apparatus for conditioning the air of an enclosure comprising a generator, a condenser exposed to outdoor temperatures and being at a level above said generator, an evaporator which functions to heat air on a heating cycle and to cool air on a cooling cycle, an absorber, conduits for conducting absorbent solution from said generator to said absorber and from said absorber to said generator, a first conduit extending from the vapor space of said generator to said condenser, a second conduit for conducting refrigerant liquid from said condenser to said evaporator, a third conduit extending to said condenser from a point in said generator below the level of absorbent solution in said generator and means for closing said first conduit and said second conduit whereby a decrease in temperature in said condenser will produce a reduced pressure in said condenser and cause absorbent solution to flow from said generator through said third conduit to said condenser to prevent freezing of refrigerant in said condenser.

5. Absorption refrigeration apparatus for conditioning the air of an enclosure comprising a generator, means for heating said generator, a condenser, an evaporator, an absorber, said absorber being exposed to outdoor temperatures, a first conduit for conducting absorbent solution from said generator to said absorber, second conduit for conducting refrigerant vapor from said evaporator to said absorber, third conduit for conducting absorbent solution from said absorber to said generator, and means for closing said second conduit and said third conduits to prevent flow therethrough whereby a decrease in absorber temperature will provide a reduced pressure in said absorber and cause absorbent solution to flow from said generator to said absorber to prevent freezing of refrigerant in said absorber.

6. Absorption refrigeration apparatus for conditioning the air of an enclosure comprising a generator, a condenser, an evaporator which functions as a heater on a heating cycle and as a cooler on a cooling cycle, an absorber exposed to outdoor temperatures, a first conduit for conducting absorbent solution from said generator to said absorber, a second conduit for conducting refrigerant vapor from said generator to said evaporator and for collecting condensed refrigerant from said evaporator, a third conduit for conducting refrigerant vapor from said second conduit to said absorber and for conducting absorbent solution from said absorber to said second conduit, valve means between said second and third conduits for preventing flow therebetween, whereby a decrease in temperature in said absorber will produce a reduced pressure in said absorber and cause absorbent to flow from said generator through said first conduit to said absorber to prevent freezing of refrigerant in said absorber.

7. Absorption refrigeration apparatus for conditioning the air of an enclosure comprising a generator, means for heating the generator, a condenser, an evaporator, an absorber, said absorber being exposed to outdoor temperatures, means for conducting refrigerant vapor under pressure from said generator to said evaporator, a first conduit for conducting absorbent solution from said generator to said absorber, second conduit for conducting refrigerant vapor from said evaporator to said absorber, third conduit for conducting absorbent solution from said absorber to said generator, valve means for closing said second conduit and said third conduits to prevent flow therethrough whereby a decrease in absorber temperature will produce a reduced pressure in said absorber and cause absorbent solution to flow from said generator to said absorber through said first conduit to fill said absorber and prevent freezing of refrigerant in said absorber, said valve means having a force insufficient to maintain itself in closed position against the head of liquid in said absorber when said generator heating means fails to supply said evaporator with refrigerant vapor under pressure, whereby absorbent solution flows from the absorber to prevent freezing of refrigerant liquid in the apparatus.

8. Absorption refrigeration apparatus for conditioning the air of an enclosure comprising a generator, gas burner means for heating said generator, a pilot burner for lighting said gas burner means, a condenser, an evaporator, an absorber, said absorber being exposed to outdoor temperatures, means for conducting refrigerant vapor under pressure from said generator to said evaporator, a first conduit for conducting absorbent solution from said generator to said absorber, second conduit for conducting refrigerant vapor from said evaporator to said absorber, third conduit for conducting absorbent solution from said absorber to said generator, valve means for closing said second conduit and said third conduits to prevent flow therethrough whereby a decrease in absorber temperature will produce a reduced pressure in said absorber and cause absorbent solution to flow from said generator to said absorber through said first conduit to fill said absorber and prevent freezing of refrigerant in said absorber, and thermostatic means responsive to the heat of said pilot burner for opening said valve means when said thermostatic means is not heated by said pilot burner.

9. In a heating and cooling system, an absorption refrigeration apparatus comprising a generator, a condenser, an evaporator which functions as a heater on heating cycles and as a cooler on cooling cycles, an absorber, means for heating absorbent solution in the generator, first conduit for conducting refrigerant vapor from the generator to the condenser, means for cooling said condenser and said absorber, second conduit for conducting refrigerant vapor from said generator to said evaporator, a first valve selectively operated to direct refrigerant vapor from the generator through said first conduit or through said second conduit, third conduit for conducting refrigerant liquid from said condenser to said evaporator, a second valve in said third conduit for controlling the flow of liquid therethrough, fourth conduct for conducting refrigerant vapor from said evaporator to said absorber to be absorbed therein and for conducting absorbent liquid from said absorber to said second conduit, a third valve between said second and fourth conduit for controlling the flow therebetween, fifth conduit for conducting absorbent solution from said generator to said absorber, sixth conduit for conducting absorbent solution from said second conduit to said generator, means for operating said apparatus on a cooling cycle by activating said condenser and absorber cooling means, positioning said first valve for flow through said first conduit, positioning said second valve in open position and positioning said third valve in open position whereby refrigerant vapor flows from said generator to said condenser where it is condensed and flows to said evaporator where it evaporates to produce a desired cooling effect, the evaporated refrigerant flows through said third valve to said absorber where it is absorbed, the absorbent solution flows from said generator to said absorber through said fifth conduit and absorbent solution flows from said absorber to said generator successively through said fourth conduit, said second conduit, and said sixth conduit, and means for operating said apparatus on a heating cycle by deactivating said condenser and absorber cooling means, positioning said first valve for flow of refrigerant vapor through said second conduit to said evaporator in which it is condensed, closing said second valve and said third valve, whereby the refrigerant condensed in said evaporator flows to said generator successively through said second conduit and said sixth conduit.

10. Absorption refrigeration apparatus comprising a generator, a condenser, an evaporator, and an absorber, conduit for interconnecting said generator and said absorber for flow of absorbent solution therebetween, conduit for interconnecting said generator, said condenser, said evaporator and said absorber for flow of refrigerant therebetween, first control means for operating said apparatus on a cooling cycle in which refrigerant vapor is passed to said condenser, liquid refrigerant is passed to said evaporator and refrigerant vapor is passed to said absorber to be absorbed by solution in said absorber, second control means for operating said apparatus on a heating cycle in which vaporized refrigerant is passed to said evaporator and refrigerant liquid is passed to said generator, means for selecting operation on a heating cycle and means for preventing operation on a heating cycle until the solution level in the absorber has been substantially lowered by the flow of solution from the absorber to the generator.

11. Apparatus according to claim 10 in which said last mentioned means is a thermostatically operated switch means which senses a decrease in temperature of the absorber when absorbent solution has drained from the absorber.

References Cited
UNITED STATES PATENTS

| | | | |
|---|---|---|---|
| 2,817,958 | 12/1959 | Beckett et al. | 62—262 |
| 2,853,276 | 9/1958 | Anderson | 165—62 |
| 3,296,814 | 1/1967 | Lynch et al. | 62—476 |

EDWARD J. MICHAEL, *Primary Examiner.*

CHARLES SUKALO, *Examiner.*